United States Patent [19]

Armstrong

[11] 4,015,690
[45] Apr. 5, 1977

[54] BICYCLE BRAKE WITH FORCE MODIFYING MEANS

[76] Inventor: Allen E. Armstrong, 34 Robinson Road, Lexington, Mass. 02173

[22] Filed: Oct. 24, 1975

[21] Appl. No.: 625,534

Related U.S. Application Data

[63] Continuation-in-part of Ser. No. 602,668, Aug. 7, 1975.

[52] U.S. Cl. .................................. 188/24; 188/71.9
[51] Int. Cl.² ......................................... B62L 1/16
[58] Field of Search ............. 188/2 D, 24, 59, 72.9

[56] References Cited

UNITED STATES PATENTS

| 3,189,128 | 6/1965 | Herbert | 188/59 |
| 3,239,032 | 3/1966 | Freholm | 188/59 |
| 3,870,127 | 3/1975 | Wilson et al. | 188/24 |

FOREIGN PATENTS OR APPLICATIONS

| 1,553,950 | 12/1968 | France | 188/72.9 |

*Primary Examiner*—Duane A. Reger
*Attorney, Agent, or Firm*—Zalkind & Shuster

[57] ABSTRACT

The calipers of a brake assembly are sequentially displaced into engagement with the wheel rim of a bicycle at low and high leverage ratios respectively by a force applied through an actuating cable device. A preload spring force resisting displacement of the high leverage caliper is reduced by buckling of a toggle device when the actuating cable begins displacement of the caliper at the high leverage ratio.

17 Claims, 9 Drawing Figures

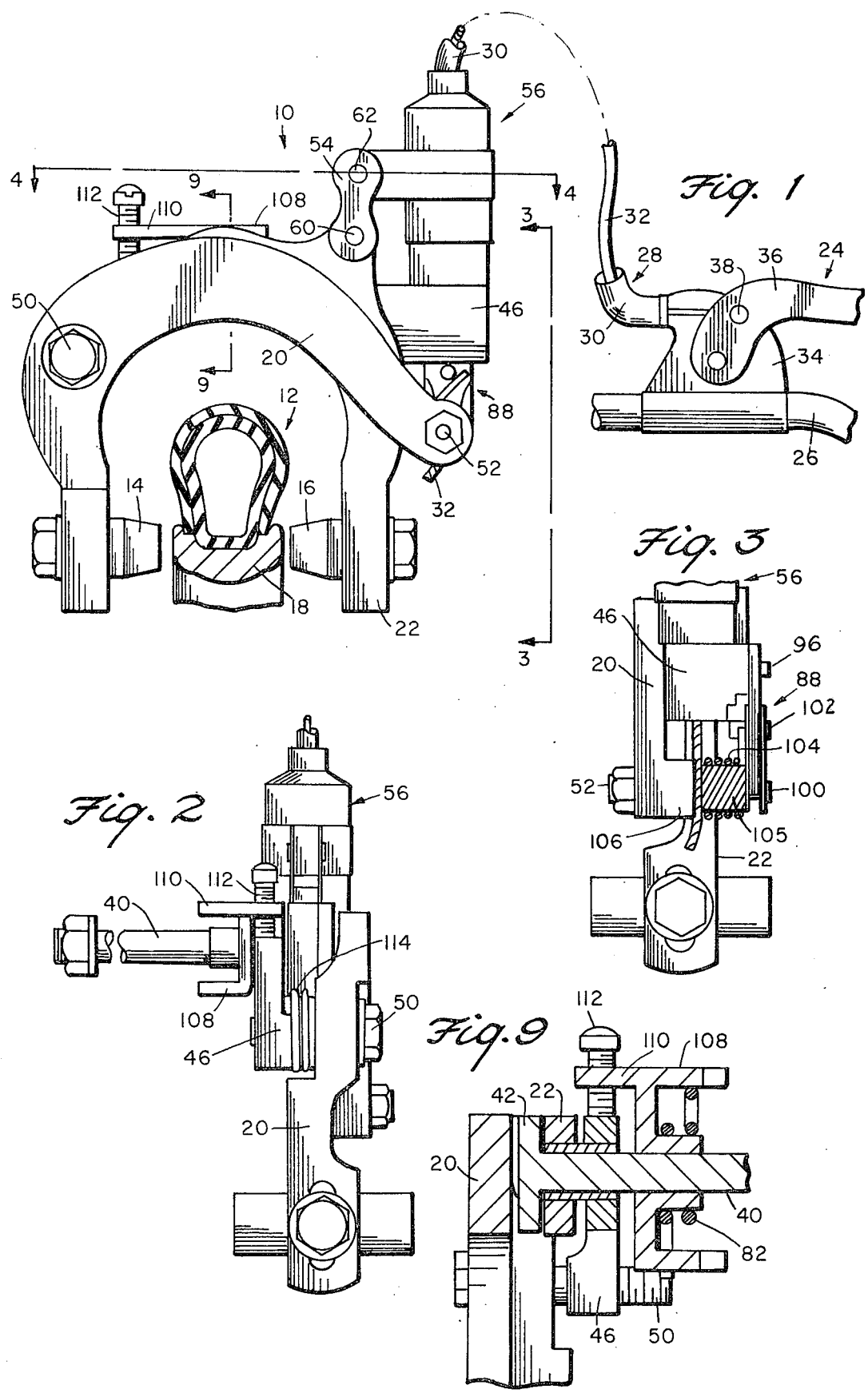

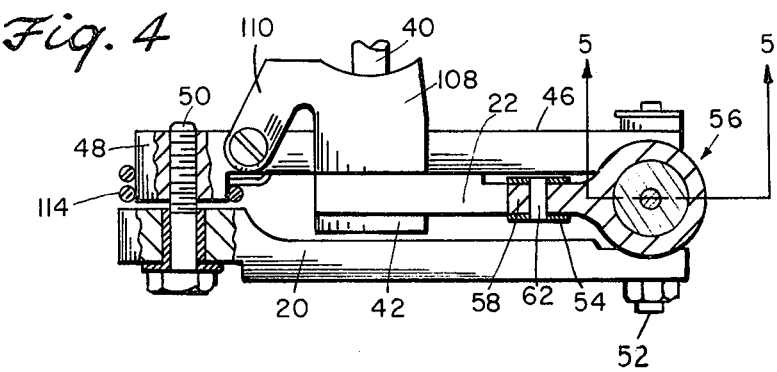
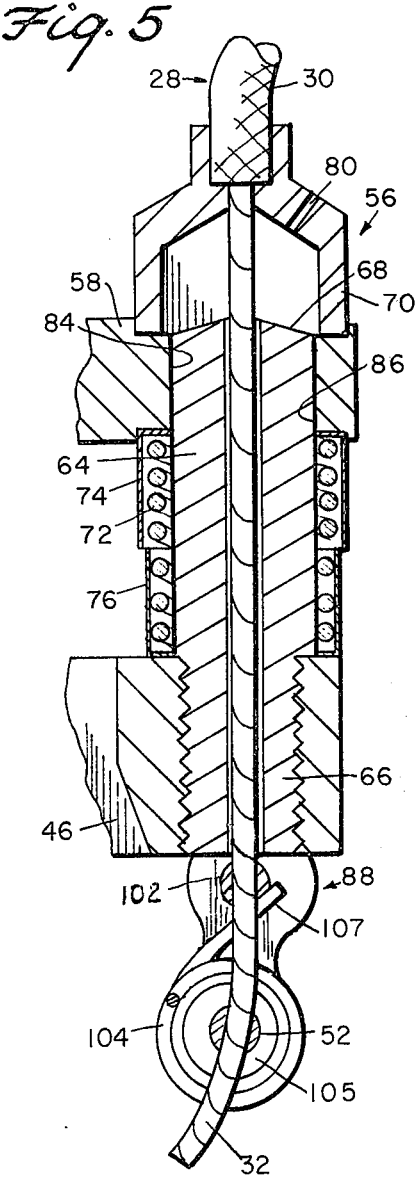
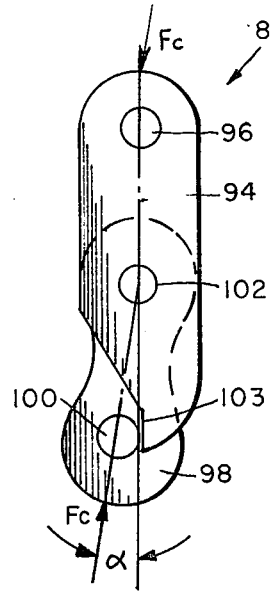
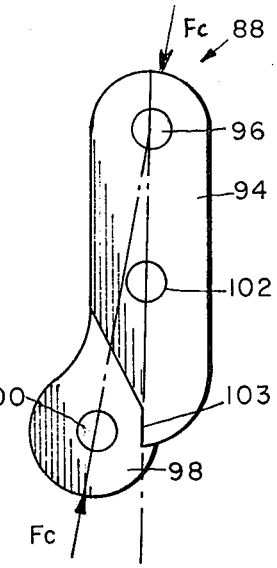
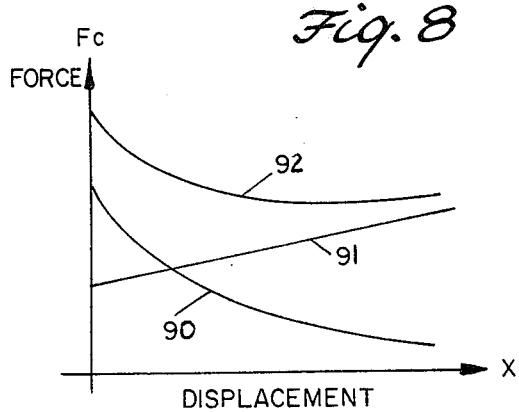

BICYCLE BRAKE WITH FORCE MODIFYING MEANS

BACKGROUND OF THE INVENTION

This invention relates to variable leverage types of bicycle brake assemblies such as disclosed in my prior copending application, Ser. No. 602,668, filed Aug. 7, 1975, with respect to which the present application is a continuation-in-part.

Generally, brake assemblies of the foregoing type include a pair of calipers having brake pads that are sequentially displaced into braking contact with the bicycle wheel rim at low and high leverage ratios respectively when force is applied through a Bowden wire cable device from a handle bar mounted actuator. The higher mechanical advantage available with such brake assemblies as compared to standard brake assemblies heretofore utilized, permits use of brake pads made of friction material having a much lower dry coefficient of friction and a higher wet coefficient of friction whereby a slightly better dry braking action is realized while wet braking is significantly improved.

In the brake assembly disclosed in my prior copending application aforementioned, a slidable caliper is disclosed displaceable on a locking track structure associated with the force applying linkage to prevent further displacement of the slidable caliper after initial brake contact is achieved resulting in subsequent displacement of the pivoted caliper at a higher leverage ratio. In such an arrangement, machining of the track and slider parts is difficult making fabrication of the brake assembly expensive. Also, the track and slider parts are exposed to wheel spray and likely to accumulate dirt and contaminate the lubricant required for the slide bearing surfaces. Further, because of the torque loading involved, track parts require high strength material or heavy section material.

In order to obtain movement of the calipers in the correct sequence, a rather heavy preload spring was required to prevent initial displacement of the high leverage caliper. Because of this resisting force requirement, design of brake assemblies in accordance with the disclosure in my prior copending application, aforementioned, was restricted by the preload spring size.

It is therefore an object of the present invention to provide an improved brake assembly of the variable leverage type which avoids the drawbacks aforementioned including a reduction in the preload spring requirement, more easily machined and less massive parts and greater protection against lubricant contamination.

SUMMARY OF THE INVENTION

In accordance with the present invention, the caliper initially displaced at a low leverage ratio is pivotally mounted about a pivot axis fixed to the bicycle frame and connected by a link to a slide collar to which the sheathing of the cable actuator is connected. The slide collar is slidably mounted on a cylindrical guide member for displacement against the bias of a shielded preload spring until locking occurs because of eccentric loading applied when brake contact is achieved. The low leverage caliper is thereby locked to a bridging lever element to which the guide member is connected. The bridging element is pivotally mounted on the same fixed pivot axis and pivotally carries the high leverage caliper to which the cable core is connected for subsequent displacement. The high leverage caliper is coupled to the bridging lever element by a toggle device through which the resisting force of the preload spring is applied. The toggle device buckles when movement of the high leverage caliper begins to thereby reduce the resisting force applied.

The slide collar and guide member form a slide coupling assembly which is less massive and more easily machined and also mounts the preload spring. A protective cap interconnects the cable sheathing with the slide collar coupling and protectively encloses the guide member coupling to retain and prevent contamination of lubricant for the slide bearing surfaces.

BRIEF DESCRIPTION OF THE DRAWING FIGURES

FIG. 1 is a front elevational view of a bicycle brake assembly in accordance with the present invention.

FIG. 2 is a side elevational view of the brake assembly as viewed from one side of FIG. 1.

FIG. 3 is a side elevational view of the brake assembly as viewed from a plane indicated by section line 3—3 in FIG. 1.

FIG. 4 is a top section view taken substantially through a plane indicated by section line 4—4 in FIG. 1.

FIG. 5 is an enlarged partial section view taken substantially through a plane indicated by section line 5—5 in FIG. 4.

FIG. 6 is a front elevational view of a disassembled force modifying toggle device associated with the brake assembly in an inactive limit position.

FIG. 7 is a front elevational view of the toggle device as shown in FIG. 6 but in an activated position.

FIG. 8 is a graph depicting the resisting force relationship for the high leverage braking action associated with the brake assembly of the present invention.

FIG. 9 is a partial sectional view taken substantially through a plane indicated by section line 9—9 in FIG 1.

DETAILED DESCRIPTION OF A SPECIFIC EMBODIMENT

Referring now to the drawings in detail, FIG. 1 illustrates a brake assembly generally referred to by reference numeral 10 associated with a conventional two wheel bicycle having a wheel 12 adapted to be engaged by the brake assembly. The brake assembly is operativey mounted on the bicycle frame so as to position a pair of brake engaging pads 14 and 16 adjacent opposite axial sides of the wheel rim 18 associated with the wheel 12. The brake pads are respectively carried by the lower end portions of a pair of calipers 20 and 22 of the brake assembly. The brake assembly is manually actuated by means of a standard type of hand lever actuator 24 adapted to be mounted, for example, on the handle bar 26 of the bicycle as shown. The hand lever actuator is connected to the brake assembly 10 through a Bowden wire cable device 28 which includes an outer tubular casing or sheathing 30 and an inner slidable core or cable 32. The outer tubular sheathing is anchored at one end of the actuator bracket 34 while the cable 32 is connected to the hand lever 36 through connecting pin 38. The ends of the sheathing 30 and cable 32 remote from the actuator 24 are connected to the brake assembly 10 in a manner to be described hereafter in detail.

Referring now to FIGS. 2 and 4 in particular, the brake assembly 10 is pivotally mounted on the frame of the bicycle by means of an attachment bolt 40 having a head 42 at one axial end abutting the caliper 22 that is pivotally carried on the bolt to establish a fixed pivotal axis about which the caliper 22 is pivotally displaced. The caliper 22 constitutes a third class lever pivotally mounted by the bolt 40 having a long lever arm that extends from the fixed pivotal axis to the point 44 on the brake pad 16 at which it contacts the wheel rim 18.

Also pivotally mounted on the bolt 40 intermediate its opposite longitudinal ends, is a bridging element 46 in the form of a first class lever which is arranged to be pivotally displaced in a pivotal plane disposed in close parallel spaced relation to the pivotal plane of movement for the caliper 22. The bridging lever element 46 as shown in FIG. 4 is provided at one end with an axially extending formation 48 through which a pivot bolt 50 extends. The caliper 20 is pivotally carried by the lever element 46 on the pivot bolt 50. The caliper 20 as more clearly seen in FIG. 1, is a first class lever having a relatively short lever arm extending between the brake pad 14 and the pivotal axis of pivot bolt 50 and a relatively long lever arm extending between the axis of pivot bolt 50 and the pivot bolt assembly 52 to which the actuator cable 32 is connected. The caliper 20 is pivotally displaced in a pivot plane disposed in close parallel spaced relation to the pivotal plane of caliper 22 on a side opposite the bridging lever element 46 as more clearly seen in FIG. 4.

The pivot bolt assembly 50 forms part of a linkage arrangement through which the calipers are mounted on the frame and operatively connected to the force applying cable device 28. This linkage arrangement also includes the bridging lever element 46 aforementioned and a link 54 pivotally connected to the caliper 22 intermediate pad 16 and the fixed pivot bolt 40. The link 54 is also pivotally connected to a locking guide assembly 56 through a connecting slide collar 58. Spaced pivot pins 60 and 62 as more clearly seen in FIG. 1 interconnect the link 54 with the caliper 22 and the slide collar 58 in order to establish a lever ratio for the caliper 22 that is determined by the distance between the axis of pivot pin 60 and the fixed axis of pivot bolt 40 constituting a short lever arm and the long lever arm aforementioned. The foregoing lever ratio represents a mechanical disadvantage under which force is transmitted by the linkage arrangement through the caliper 22 to the brake pad 16 during initial take up displacement of the caliper 22. The caliper 20, on the other hand, transmits force at a relatively high mechanical advantage during its subsequent displacement. The high mechanical advantage is determined by the short and long lever arms aforementioned in connection with the caliper 20. It will, therefore, become apparent that initial take-up movement of caliper 22 occurs at a relatively rapid rate with a relatively small force while subsequent movement of the caliper 20 occurs more slowly but with a substantially higher brake engaging force.

As more clearly seen in FIG 5, the guide assembly 56 includes a cylindrical guide member 64 having a lower threaded end portion 66 connected to the end portion of the bridging lever element 46 remote from its pivotal mounting on the frame established by the bolt assembly 40. The upper end of the cylindrical guide member 64 slidably mounts the slide collar 58. A bore 68 is formed centrally through the guide member 64 and receives the cable 32 therethrough. The lower projecting end of the cable 32 may accordingly be connected to the caliper 20 by the bolt assembly 52 as aforementioned. The sheathing 30 of the cable device is anchored to a protective cap 70 secured to the slide collar 58 in coaxial relationship to the cylindrical guide member 64. The cylindrical guide member and slide collar 58 are thus slidably displaceable relative to each other within limits established by the axial space 78 formed within the cap 70 at the upper end of the guide member. The guide member is continuously biased downwardly relative to the slide collar 58 as viewed in FIG. 5 by a preloaded spring 72 protectively enclosed within telescoping, plastic tubular shield sections 74 and 76. The upper shield section 74 is fixed to the slide collar 58 while the lower shield section 76 is fixed to the bridging lever element 46. The axial space 78 formed within the cap 70 may retain lubricant for the cylindrical slide bearing surfaces associated with the guide member 64 and slide collar 58. A bore 80 may be formed in the cap 70 for introducing lubricant into the space 78 when called for.

It will be apparent that a force applied to the cable device 28 will be transmitted through the sheathing 30 and cable 32 to cause relative displacement of the guide member 64 and slide collar 58 against the bias of spring 72. Initially, the housing 30 of the cable device exerts a downward force on the slide collar 58 through cap 70 while an equal and opposite upward force is exerted on caliper 20 by core 32 through the attaching bolt 52. Motion of the caliper 20 in response to the force transmitted through core 32 is prevented prior to initial brake pad contact by a locking action to be described hereafter. Also, the guide member 64 is held stationary by the bridging lever element 46 to which it is rigidly connected because of frictional resistance of its pivotal mounting on bolt assembly 40 and the resisting bias of a centering spring 82 mounted on the bolt assembly 40 as shown in FIG. 9. The actuating force then transmitted by the sheathing 30 and the cap 70 displaces the sliding collar 58 downwardly as viewed in FIG 5. Since the slide collar 58 is interconnected by the link 54 to the caliper 22, the caliper 22 will be pivotally displaced about the fixed pivot axis of pivot bolt 40 at the low leverage ratio as aforementioned into braking contact with the wheel rim 18. The loading thereby applied to the slide collar 58 is eccentric relative to the longitudinal axis of the guide member 64 on which it is slidable because of the spacing between this longitudinal axis and the connecting pin 62 through which the link 54 is connected to the slide collar. Such eccentric loading of the slide collar causes it to tilt or be angularly displaced relative to the guide member 64 to lock the slide collar at points 84 and 86 as identified in FIG 5 as a result of brake pad contact causing a force at pad 16 opposing motion of caliper 22. Continued application of actuating force to the cable device will then be transmitted by the cable 32 to the caliper 20 through pivot bolt assembly 52 and to the bridging lever element 46 through a force modifying toggle device generally referred to by reference numeral 88. Continued relative displacement between the slide collar 58 and the bridging lever element 46 would ordinarily continue to be resisted by frictional locking of the locking guide assembly 56 during subsequent displacement of the caliper 20 at the high leverage ratio.

Referring now to FIGS. 3 and 6 in particular, the force modifying toggle device 88 includes an upper link 94 pivotally connected by a pivot pin 96 to the bridging lever element 46. A lower link 98 is pivotally connected to the pivot bolt assembly 52 through an extension pivot pin 100. The upper link 94 is pivotally interconnected with the lower link 98 by means of an intermediate floating pivot pin 102. A stop formation 103 is formed on the upper link 94 of the toggle device in spaced relation below the intermediate pin 102 and is adapted to engage the extension pin 100 in a limit position of the toggle device as more clearly seen in FIG. 6. The links 94 and 98 are biased to this limit position by a torsion coil spring 104 mounted on an enlarged section 105 of the pivot bolt assembly 52 abutting the lower link 98 and spaced from an axial formation 106 of the caliper 20. The section 105 serves to clamp the cable 32 to formation 106 and forms a support mandrel for spring 104 as shown in FIG. 3. One end of the torsion spring is anchored to the caliper 20 while the other end 107 abuts pivot pin 102. In the limit position shown in FIG. 6, the extension pin 100 is out of alignment with the pins 96 and 102 by a small angle $\alpha$ as denoted in FIG. 6. Accordingly, the force transmitted through the toggle device will tend to cause buckling thereof. This buckling will, however, be resisted by the spring 104 which is overcome by increasing transmitted force when the aforementioned locking of the slide collar 58 occurs relative to the guide member 64. Buckling of the toggle device at that point as shown in FIG. 7 will accordingly reduce the resisting force applied during displacement of the caliper 20 at the high leverage ratio as graphically depicted by curve 90 in FIG. 8. Thus, the toggle device provides a negative, non-linear spring rate for resisting movement of the caliper 20.

As more clearly seen in FIG 9, the fixed pivot bolt assembly 40 clamps an adjustment bracket 108 to the frame (not shown). The bracket includes an arm 110 that overlies the bridging lever element 46. An adjustable centering screw 112 is threadedly mounted by the arm 110 for engagement with the bridging lever element. The centering spring 82 biases the bridging lever element into engagement with the adjusting screw in order to establish a centered position for the calipers 20 and 22 prior to the application of braking force.

As shown in FIGS. 2 and 4, a preload spring 114 is mounted on the pivot bolt 50. Spring 114 biases caliper 20 clockwise as viewed in FIG. 1 to a limit position in which the links 94 and 98 of the toggle device 88 are fully extended as shown in FIG. 6. The action of spring 114 in resisting counterclockwise displacement of caliper 20 by the cable core 32 is characterized by a positive linear spring rate as depicted by curve 91 in FIG. 8.

In summary, actuating force exerted through the actuator 24 is transmitted to the brake assembly simultaneously by the sheathing 30 and core 32 of the Bowden wire cable device. The force transmitted by the sheathing 30 initially pushes the cap 70 and slide collar 58 downwardly and through link 54 pivotally displaces caliper 22 clockwise about the fixed axis through bolt 40 as viewed in FIG. 1 to obtain initial brake contact. Following initial brake contact between the wheel rim 18 and pad 16, the cable core 32 pulling on the caliper 20 through bolt 52, pivotally displaces both the caliper 20 and bridging element 46 connected thereto about the fixed pivot axis in a counter-clockwise direction until the other pad 14 contacts the wheel rim. Continued increase in the actuating force applied causes the toggle device 88 to yield or buckle to allow counter-clockwise movement of caliper 20 relative to the bridging lever element 46 about the axis of bolt 50. At this point the guide assembly 56 locks because of the eccentric loading of the slide collar 58 to prevent any relative displacement between caliper 22 and lever element 46 during continued movement of caliper 20 applying force at the high leverage ratio.

Upon release of the actuator 24, the bias of spring 104 returns the toggle device 88 toward its limit position causing clockwise movement of caliper 20 as viewed in FIG 1 to relieve contact pressure on the wheel rim. The caliper 22 is then displaced counter-clockwise under the bias of spring 72. When the force on caliper 22 is relieved, the lever element 46 swings back into contact with the centering screw 112.

FIG. 8 also shows a typical resultant curve 92 representing the combined effect of the toggle device 88 and the preload spring 114 in resisting movement imparted to caliper 20. The spring rates for the toggle device 88 and the preload spring 114 may be selected to provide a positive, a negative or a nearly zero resultant spring rate while providing sufficient preload to lock caliper 20 until both brake pads contact the wheel rim 18. The advantage of the negative spring rate depicted by curve 90, is to permit more of the cable actuating force to be applied to the brake pads and less to the spring 114. After spring 114 has ceased its locking function preventing initial movement of caliper 20, it need only be strong enough to insure return movement of caliper 20 to its rest position before caliper 22. The spring force necessary for such rapid return movement of caliper 20 is substantially less than the force necessary for reliable locking action in the absence of the toggle device. The negative spring rate characteristic of the toggle device allows the resisting force to decrease after the linkage unlocks, to more closely approximate the resisting force required during all operational phases not possible with a simple preload spring arrangement.

I claim:

1. In combination with a force applying device, a brake assembly for an element rotatably mounted on a frame, comprising a pair of calipers, brake pads carried by the calipers and engageable with the rotatable element, means pivotally mounting at least one of the calipers for angular displacement about an axis fixed to the frame, linkage means connected to said calipers for displacement thereof respectively at different leverage ratios, guide means connected to the linkage means for guiding movement of said one of the calipers, and force transmitting means connecting the force applying device to the linkage means and to the other of the calipers for sequentially displacing the calipers relative to the rotatable element at said different leverage ratios, said linkage means including a lever element pivotally mounted on the frame about said fixed axis, a link connecting said one of the calipers to the force transmitting means, and means pivotally connecting said other of the calipers to said lever element about a movable axis establishing a higher of said leverage ratios for said other of the calipers.

2. The combination of claim 1 wherein said guide means includes a pair of slide coupling elements respectively connected to the lever element and the link and lock means mounted by the slide coupling elements for limiting relative displacement of the lever element and the link in response to initial engagement of said one of the calipers with the rotatable element.

3. In combination with a force applying device, a brake assembly for an element rotatably mounted on a frame, comprising a pair of calipers, brake pads fixed to the calipers and engageable with the rotatable element, means pivotally mounting at least one of the calipers for angular displacement about an axis fixed to the frame, linkage means connected to said calipers for displacement thereof respectively at different leverage ratios, guide means connected to the linkage means for guiding movement of said one of the calipers, and force transmitting means connecting the force applying device to the linkage means and to the other of the calipers for sequentially displacing the calipers relative to the rotatable element at said different leverage ratios, said guide means including a pair of slide coupling elements respectively connected to the lever element and the link and lock means mounted by the slide coupling elements for limiting relative displacement of the linkage means, said force applying device including a tubular casing and an actuator cable slidable therein, said force transmitting means including means anchoring the tubular casing to one of the slide coupling elements and force modifying means coupling the other of the coupling elements to said other of the calipers.

4. The combination of claim 3 wherein said linkage means includes a lever element pivotally mounted on the frame about said fixed axis, a link connecting said one of the calipers to the force transmitting means, and means pivotally mounting said other of the calipers on said lever element at a location establishing a higher of siad leverage ratios for said other of the calipers.

5. The combination of claim 4 wherein said force modifying means includes toggle links respectively connected to the lever element and the other of the calipers at spaced pivot points, a pivot connection interconnecting the toggle links at an intermediate pivot point displaceable relative to said spaced pivot points from a limit position, and spring means biasing said toggle links to said limit position offset from the spaced pivot points by a minimum amount.

6. The combination of claim 3 wherein said force modifying means includes toggle links respectively connected to the lever element and the other of the calipers at spaced pivot points, a pivot connection interconnecting the toggle links at an intermediate pivot point displaceable relative to said spaced pivot points from a limit position, and spring means biasing said toggle links to said limit position offset from the spaced pivot points by a minimum amount.

7. In combination with a force applying device, a brake assembly for an element rotatably mounted on a frame, comprising a pair of calipers engageable with the rotatable element, force transmitting means operatively connecting the force applying device to the calipers for displacement thereof toward engagment with the rotatable element at different leverage ratios, preload means for respectively resisting displacement of each of the calipers with a bias that increases in response to displacement of said calipers, and force modifying means connected to the force transmitting means for decreasing the resisting bias of the preload means applied to one of the calipers when being displaced at one of the different leverage ratios.

8. The combination of claim 7 including lock means connected to the force transmitting means for limiting initial displacement of the other of the calipers at another of the different leverage ratios.

9. The combination of claim 8 wherein said force modifying means is rendered effective in response to increase in the resisting bias applied to said other of the calipers above a predetermined value.

10. The combination of claim 9 wherein said force modifying means includes a pair of toggle links respectively connected to the force transmitting means and said one of the calipers at spaced pivot points, a pivot connection interconnecting the toggle links at an intermediate pivot point displaceable relative to said spaced pivot points from a limit position, and spring means biasing said toggle links to said limit position offset from the spaced pivot points by a minimum amount.

11. In combination with a force applying device, a brake assembly for an element rotatably mounted on a frame, comprising a pair of calipers engageable with the rotatable element, force transmitting means operatively connecting the force applying device to the calipers for displacement thereof toward engagement with the rotatable element at different leverage ratios, preload means for respectively resisting displacement of each of the calipers, lock means connected to the force transmitting means for limiting initial displacement of one of the calipers at a lower of the leverage ratios, and means coupling the other of the calipers to the force transmitting means for applying a resisting bias of the preload means to the other of the calipers during subsequent displacement at a higher of the leverage ratios.

12. The combination of claim 11 wherein said force transmitting means includes a bridging element on which the other of the calipers is pivotally carried, pivot means fixed to the frame for pivotally mounting said one of the calipers and the bridging element about a common pivot axis, a guide member connected to the bridging element, a coupling element slidably mounted on the guide member and link means interconnecting said one of the calipers with the coupling element for eccentric loading thereof in response to initial brake contact.

13. The combination of claim 12 wherein said preload means comprises a coil spring mounted on the guide member in abutment with the coupling and bridging elements.

14. The combination of claim 13 wherein said lock means includes cylindrical slide bearing surfaces formed on the guide member and the coupling element arranged to bind in response to said eccentric loading of the coupling element.

15. The combination of claim 14 including a protective cap connected to the coupling element in protective enclosing relation to the guide member and the slide bearing surfaces, said force applying device being connected to the coupling element through the protective cap.

16. The combination of claim 12 wherein said lock means includes cylindrical slide bearing surfaces formed on the guide member and the coupling element arranged to bind in response to said eccentric loading of the coupling element.

17. The combination of claim 16 including a protective cap connected to the coupling element in protective enclosing relation to the guide member and the slide bearing surfaces, said force applying device being connected to the coupling element through the protective cap.

* * * * *